United States Patent [19]

Braden

[11] Patent Number: 5,553,981
[45] Date of Patent: Sep. 10, 1996

[54] CARGO HOLDER

[76] Inventor: Leon T. Braden, 18685 N. Roddy Rd., Centralia, Mo. 65240

[21] Appl. No.: 141,287

[22] Filed: Oct. 26, 1993

[51] Int. Cl.⁶ .................................................. B60P 7/08
[52] U.S. Cl. .................. 410/116; 410/101; 24/115 K; 24/343; 24/303; 24/265 CD
[58] Field of Search ................. 410/96, 97, 98, 410/99, 101, 106, 116, 156; 24/115 K, 265 CD, 343, 370, 303; 248/499, 503, 505

[56] References Cited

U.S. PATENT DOCUMENTS

| | | | |
|---|---|---|---|
| 1,251,861 | 1/1918 | Caldwell | 248/499 |
| 2,117,989 | 5/1938 | Ryan | 24/370 X |
| 2,124,049 | 7/1938 | Battista et al. | 24/343 X |
| 2,346,276 | 4/1944 | Reittinger | 24/343 X |
| 2,646,097 | 7/1953 | Gaverth et al. | 150/166 |
| 2,775,804 | 1/1957 | Ayoub | 24/343 X |
| 3,011,818 | 12/1961 | Matthiessen | 248/499 |
| 3,176,951 | 4/1965 | McFadyen et al. | 24/343 X |
| 3,209,706 | 10/1965 | Broling | 410/99 |
| 3,212,303 | 10/1965 | Haffner et al. | 24/343 X |
| 3,332,119 | 7/1967 | Sherwood | 24/343 X |
| 3,762,097 | 10/1973 | Gallo | 410/151 X |
| 3,797,859 | 3/1974 | Vasquez | 410/116 |
| 4,072,113 | 2/1978 | Thurston | 410/107 |
| 4,191,108 | 3/1980 | Jones | 410/116 X |
| 4,402,489 | 9/1983 | Murray | 410/99 |
| 4,812,093 | 3/1989 | Millar, Jr. | 410/110 |
| 4,818,162 | 4/1989 | Zukowski et al. | 410/116 |
| 4,842,460 | 6/1989 | Schlesch | 410/121 |
| 4,850,770 | 7/1989 | Millar, Jr. | 410/116 |

FOREIGN PATENT DOCUMENTS 3618420  12/1987  Germany ........................ 410/116

Primary Examiner—Karen B. Merritt
Assistant Examiner—Stephen Gordon
Attorney, Agent, or Firm—Klaas, Law, O'Meara & Malkin, P.C.

[57] ABSTRACT

A cargo holder for securing cargo loads in the bed of a pickup truck consists of a metal bar formed with a first hook at one end to engage the bottom edge of the wall of a pickup truck and a second hook at an opposite end to catch a loop in a tie-down rope. A flexible cylindrical tube disposed around the body of the metal bar can be slid downwards when securing the holder to a truck wall, thereby creating a clamping action between the tube and the first hook which secures the holder to the wall of the pickup truck. After several cargo holders have been positioned around the cargo bed and tie-down ropes have been arranged so as to catch the second hooks of the holders, the foam tubes of the cargo holders are slid upwards so as to provide a cushioned barrier between each cargo holder and the truck's finish, thereby preventing accidental marring of the truck.

11 Claims, 2 Drawing Sheets

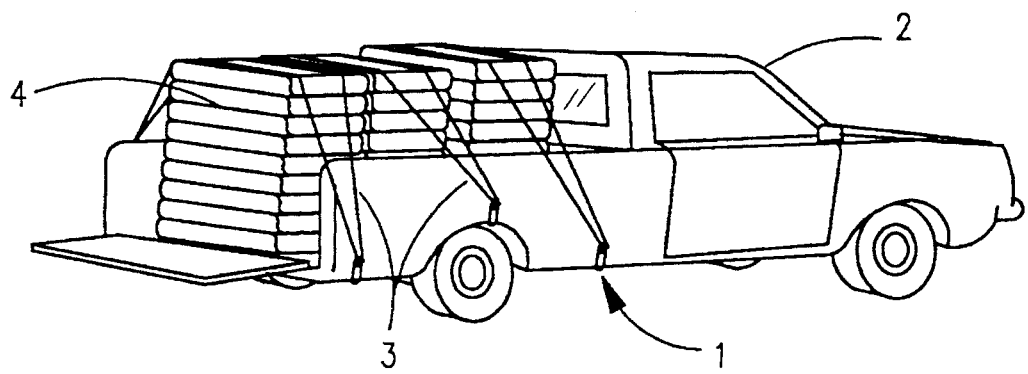
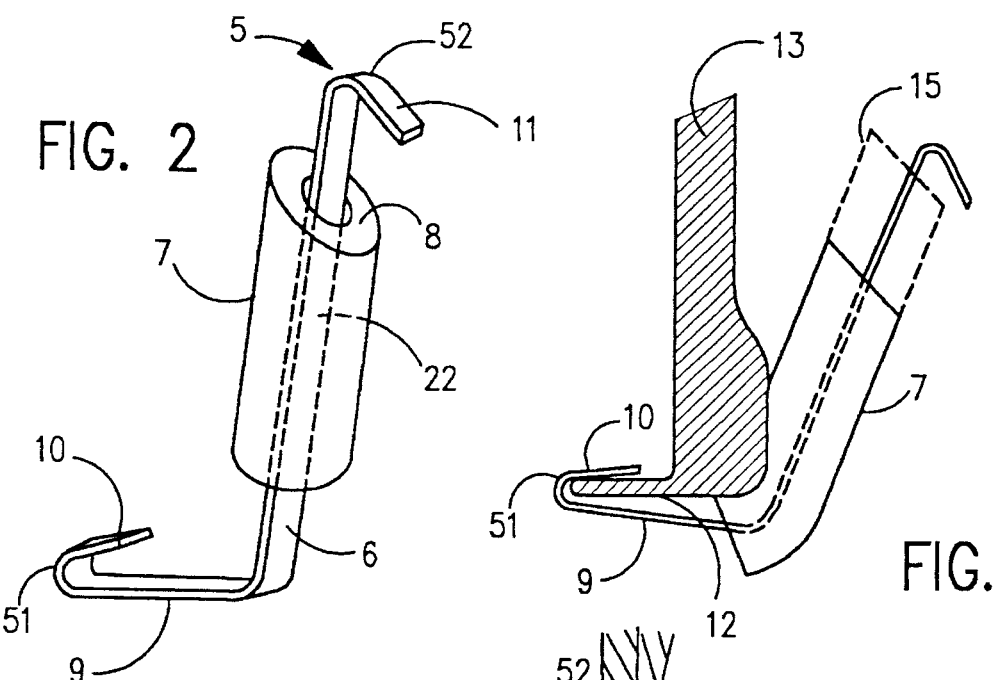

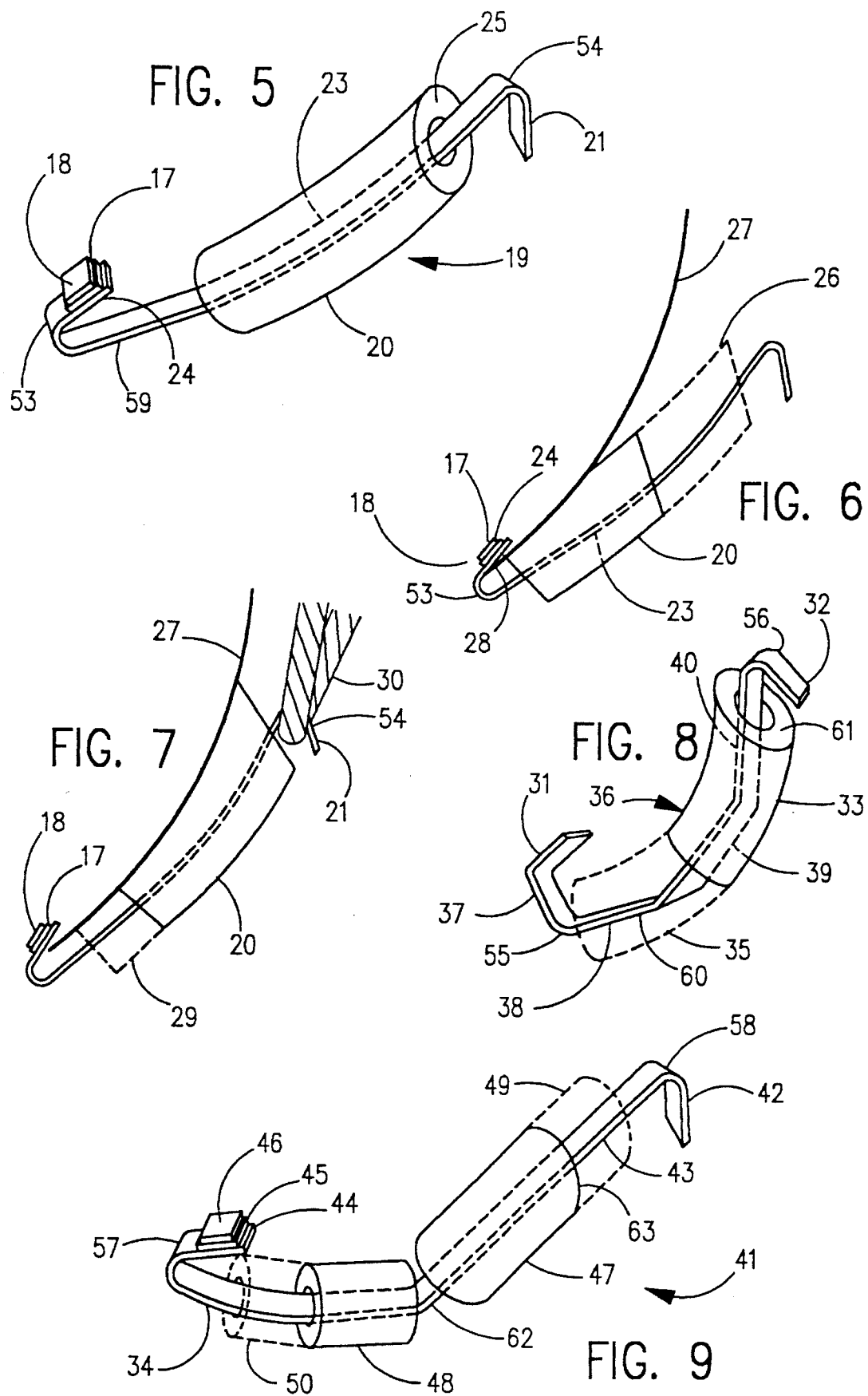

CARGO HOLDER

BACKGROUND

This invention pertains to cargo holders for pickup trucks. Many individuals and businesses rely on open bed pickup trucks for frequent hauling of equipment and materials that do not ride well without being secured by ropes, cables or other means. These loads can be vulnerable to tipping, sliding or flying out of a pickup truck's bed. Consequently, many devices have been developed for securing such a load. However, these devices have not always been effective and have given rise to numerous other problems. They have not always supported large loads, have been difficult to install, have not allowed for uniform and/or selective positioning of tie-down ropes around a load, have often marred a truck's finish, have interfered with loading a truck, and have not always been easy to manufacture.

Some of the previously developed devices were used to brace a load. However, the problem with braces was that they were often limited to use with smaller loads, as the weight of the braces would be immense if they were designed for larger loads. Furthermore, braces could not secure a fly away load.

Many of the available cargo holding devices bolted to the bed or bed rail of a pickup truck, thereby allowing a user to secure a load with the use of cables or ropes. However, these devices were not removable and often protruded upwards from the bed rail, thereby interfering with the loading of an item into a truck over the side of the bed, or with the fastening of a bed cover or tarpaulin. Additionally, these devices often required measuring, drilling and gathering of an assortment of tools for initial installation.

Probably the most popular cargo holding device consisted of an eye-bolt running through a large rubber block. The block was inserted into a hole in the bed rail and the bolt was then tightened so as to deform the rubber block, making the block larger in diameter below the hole in the bed rail. Consequently, the cargo holding device was secured to the pickup truck in a semi-permanent manner, and tie-down ropes could be attached to it. However, many users of these devices found that the shifting of large loads could actually cause these tie-downs to pull out of their sockets. In addition, these tie-down devices frequently marred a truck's finish.

Other cargo holding devices used straps, suction cups and other means to make the devices easier to install and remove. However, these devices did not have the durability of the present invention, could not be mounted above wheel wells, and most importantly, required numerous manufacturing steps.

For the foregoing reasons, there arose a need for a cargo holder that could support large loads, would be easy to install and remove, would allow for uniform and/or selective positioning of tie-down ropes around a load, would not mar a truck's finish, would not interfere with the loading of a truck, and would be simple to manufacture.

SUMMARY

The present invention is directed to a device that satisfies this need for an improved pickup truck cargo holder.

The invented device is a cargo holder comprising a metal bar having a body portion between a top end and a bottom end. A first hook is formed at the bottom end of the bar, and a second hook is formed at its top end. A flexible cylindrical tube with a length at least half as long as the bar's body is disposed around the bar so that the tube may slide along the bar.

In use, the first hook of the cargo holder is attached to the bottom edge of a wall of a pickup truck's cargo bed. The flexible tube is then slid downwards towards the first hook so that the distance between the hook and the tube is narrowed and the cargo holder is clamped to the truck's wall. A user is then free to position other cargo holders at various locations along the walls of the truck's cargo bed. After tie-down ropes have caught the second hooks of the holders, the flexible tubes are slid upwards, thereby creating a cushioned barrier between the second hooks and the truck's finish.

It is, therefore, a primary object of the present invention to provide a cargo holder for a pickup truck which overcomes the foregoing drawbacks of other cargo holding devices.

In the achievement of the foregoing object, it is a very important object of the present invention to provide a cargo holder which is strong enough, when used in conjunction with tie-down ropes, to secure loads which are vulnerable to tipping, sliding or flying out of a pickup truck's bed.

Another important object of this invention is to provide a cargo holder which may be easily and detachably installed at various locations around the cargo bed of a pickup truck.

It is a further object of this invention to provide a cargo holder which will not mar the finish of a pickup truck or otherwise require drilling or sawing into the body of a pickup truck.

It is yet another object of this invention to provide a cargo holder which, when installed, will not interfere with the loading or unloading of the truck, nor interfere with the fastening of a bed cover or tarpaulin.

It is also a very important object of this invention to provide a cargo holder constructed of a minimum number of parts, thereby simplifying its manufacturing process.

BRIEF DESCRIPTION OF THE DRAWINGS

These and other features, aspects and advantages of the present invention will become better understood with regard to the following description, appended claims and accompanying drawings where:

FIG. 1 is a perspective view, on a reduced scale, showing several cargo holders installed along a bottom edge of a wall of a pickup truck's cargo bed.

FIG. 2 is a perspective view, showing a cargo holder embodying the principles of this invention. This cargo holder is specifically adapted for use above a truck's wheel well.

FIG. 3 is a side elevational view of the cargo holder of FIG. 2 installed in its initial position on a pickup truck, parts being transparent to reveal details of construction.

FIG. 4 is a side elevational view of the cargo holder of FIG. 2 in final position with a tie-down rope attached thereto, parts being transparent to reveal details of construction.

FIG. 5 is a perspective view, showing a cargo holder of the type mounted at a bottom edge of a wall of a truck's cargo bed (other than above a wheel well).

FIG. 6 is a side elevational view of the cargo holder of FIG. 5 installed in its initial position on a pickup truck, parts being transparent to reveal details of construction.

FIG. 7 is a side elevational view of the cargo holder of FIG. 5 in final position with a tie-down rope attached thereto, parts being transparent to reveal details of construction.

FIG. 8 is a perspective view, showing a variation of the cargo holder in FIG. 2.

FIG. 9 is a perspective view, showing a variation of the cargo holder in FIG. 5.

DESCRIPTION OF THE PREFERRED EMBODIMENT

As shown in FIG. 1, a cargo holder 1 embodying the principles of this invention may be used in conjunction with tie-down ropes 3 to secure cargo 4 riding in the bed of a pickup truck 2. The procedure of securing cargo 4 to truck 2 with ropes 3 is a procedure well known in the relevant art. However, as disclosed in the teachings of the present invention, a simple, detachable, strong yet non-abrasive device for securing ropes 3 to truck 2 has until now, not been developed.

In general, the ideals of this invention are illustrated in FIGS. 2–4. An initially flat metal bar 6 is formed so as to generally conform to the vertical contour of a truck wall 13. A first hook 51 is then formed at one end of metal bar 6 so that it may engage the bottom edge 12 of truck wall 13. A second hook 52 is formed at another end of metal bar 6, opposite to first hook 51, so that it can be caught by the looped end of a tie-down rope 14. The second hook 52 comprises a maximum dimension extending at an acute angle relative to a longitudinal axis of the bar body 22. In other words, an acute angle is formed between segments 11 and 22 of metal bar 6 (see FIGS. 2 & 3); and the length of segment 11 is designated as the second hook's maximum dimension. A flexible cylindrical tube 7 is disposed around metal bar 6. The length of the tube 7 is such that the tube may slide over at least part of the length of the bar 6 between first hook 51 and second hook 52. The maximum dimension of the second hook 52 should be greater than the inside diameter of the flexible tube 7.

In use, the first hook 51 of cargo holder 5 is placed in position so as to engage the bottom edge 12 of truck wall 13. Flexible tube 7 is then slid downward toward first hook 51 so that the distance between the end of first hook 51 and a lower portion of flexible tube 7 is greatly reduced (as shown by position 16 in FIG. 4). This creates a clamping affect around wall 13 so that cargo holder 5 will remain in place while other cargo holders are positioned along the bottom edge of a truck's wall and tie-down ropes 3 are arranged over cargo 4. Next, the looped end of a tie-down rope 14 is looped around cargo holder 5 so as to catch second hook 52. After all cargo holders 1 have been caught by tie-down ropes 3, all slack is removed from the ropes. However, the ropes 3 are not cinched tight until tube 7 has been slid upwards toward second hook 52 (as shown by position 15 in FIG. 3). By this upward movement of tube 7, a cushioned barrier is placed between truck wall 13 and second hook 52 so that metal bar 6 will not mar or otherwise damage the finish of wall 13. See FIG. 4.

The inventor has found that metal bar 6 is of sufficient strength to hold any conceivable cargo load when constructed of an initially flat piece of steel having a width of ¾" and a depth of ⅛". The length of the bar 6 will vary somewhat depending on the model of pickup truck it is adapted for, and its placement on the pickup. After forming, the metal bar 6 may be painted with or dipped in a solution which, when dried, gives it a rubberized or plasticized coating. Such coating provides further protection against accidental marring of a truck's finish.

The inventor has also found that a variety of flexible materials will suffice in the construction of flexible tube 7. The best results were obtained when the tube 7 was constructed from a relatively dense, sturdy sponge rubber having a thickness of approximately ⅜". When formed into a tube which would accommodate a ¾"×⅛" metal bar, the tube had an inside diameter of ¾" and an outside diameter of 1 ½". The inventor also experimented with tubes made of solid rubber. However, these tubes sometimes left scuff marks on a truck's finish when the forces and movement of tie-down ropes caused the tubes to rub against the wall of a truck. The tubes can be constructed from an initially flat piece of material which is then formed around an already shaped metal bar 6 and then bonded with glue or other means, or alternatively, they can be made of uniform construction and placed around metal bar 6 before the formation of the first and second hooks. The inventor has further found that top surface 8 of tube 7 can be cut at an approximately 45 degree angle so that its contour runs substantially parallel to the slope of second hook 52. Note that 1) the contour of the second hook is understood to be a contour running longitudinally in the direction of the second hook's maximum dimension, and 2) the contour of the second hook faces the top surface 8 of the flexible tube 7. While a flat contour 8 is acceptable, a contoured surface allows tube 7 to travel a greater distance in an upwards direction along the metal bar 6 and actually allows a portion of tube 7 to extend upwards from the top of second hook 52, thereby providing increased protection against marring by said hook by forming a barrier between the hook 52 and truck wall 13.

In addition to the generic invention disclosed above, the inventor has illustrated several detailed embodiments of his invention in the drawings. FIGS. 2–4 illustrate a first embodiment 5 which is designed for use above the wheel wells of "CHEVY®", "GMC®" and "MAZDA®" pickup trucks. A flat metal bar 6, which is approximately 8" in length, is formed so as to create segments 9, 10, 11 and 22. At the lower end of vertical body segment 22, a first hook 51 for engaging the bottom edge 12 of truck wall 13 is formed from segments 9 and 10. Segment 9 is bent in one direction so as to form an angle of approximately 110 degrees with body segment 22. Segment 10 is further bent in the same direction to form the second side of hook 51 which is nearly parallel to the side formed by segment 9. A second hook 52 for catching tie-down rope loop 14 is formed at end of bar 6 opposite to hook 51 by bending segment 11 in a direction opposite to the bend of segment 9. Segments 22 and 11 form an angle of preferably 45–60 degrees. A flexible cylindrical tube 7 is disposed around segment 22 so that it covers approximately three-fourths of the length of the segment. A top surface 8 of tube 7 is cut at a 45 degree angle so that it is substantially parallel to segment 11. Use of this cargo holder is as described above.

FIGS. 5–7 illustrate a second embodiment 19 of cargo holder 1 which is designed for use along the bottom edge 28 of a truck wall 27. A wall similar to wall 27 is generally found on "CHEVY®", "GMC®" and "DODGE DAKOTA®" pickup trucks. A flat metal bar 59 of about 10" in length is formed to create segments 21, 23 and 24. Body segment 23 has a gradual curvature which generally follows the curvature of truck wall 27. At a lower end of segment 23, segment 24 is bent in one direction, thereby creating a first hook 53. At an end of bar 59 opposite to hook 53, segment 21 is bent in an opposite direction to create a second hook 54. Flexible cylindrical tube 20 is disposed around segment 23 and covers approximately two-thirds of its length. A top surface 25 of tube 20 is cut at a 45 degree angle so that it is substantially parallel to segment 21.

In use, first hook 53 engages the bottom edge 28 of truck wall 27. Flexible tube 20 is then slid downward to position 29 (as shown in FIGS. 6 & 7). As in other embodiments, the clamping action created by narrowing the distance between hook 53 and a lower portion of tube 20 enables the cargo holder 19 to remain in position while other cargo holders 1 and tie-down ropes 3 are positioned. However, in addition to the clamping action, the inventor has found that it is advisable to attach a magnet 17 to segment 24 on the outer side of hook 53. A magnet cover 18 is then stacked on top of magnet 17. As the slope of truck wall 27 is very steep, the attraction between magnet 17 and wall 27 prevents the weight of cargo holder 19 from causing it to slide down wall 27 over time, thereby becoming dislodged from its position. After the looped end of a tie-down rope 30 is looped around hook 54, but before the rope is synched tight, tube 20 is moved upwards into position 26.

FIG. 8 illustrates a third embodiment 36 of cargo holder 1 which is designed for placement above the wheel wells of a "DODGE DAKOTA®" pickup truck. This cargo holder consists of an initially flat metal bar 60 of about 10" in length which is formed into segments 31, 32, 37, 38, 39 and 40. Segment 39 is bent in one direction so as to form an angle of approximately 140 degrees with segment 40. Segment 38 is bent in the same direction to form an angle of about 130 degrees with segment 39. Segment 37 and 31 are then bent in the same direction to form angles of about 90 degrees between segments 37 and 38, and segments 31 and 37. Segments 31, 37 and 38 thereby form a first hook 55 at a lower end of cargo holder 36. Segment 32 is bent in a direction opposite to the other bends so as to form a second hook 56 at an upper end of the cargo holder 36. A flexible cylindrical tube 33 with a 45 degree sloped top surface 61 is disposed around segments 38, 39 and 40 so that at any one time the tube 33 covers approximately one-half of the three segments' combined length.

In use, first hook 55 engages the bottom edge of a truck wall (above a wheel well). Tube 33 is then slid downward into position 35, creating a clamping affect between segment 31 and tube 33. After securing tie-down ropes 3, tube 33 is slid into the position illustrated in FIG. 8.

FIG. 9 illustrates a fourth embodiment 41 of cargo holder 1 which is designed for use along the bottom edge (other than above the wheel wells) of a "MAZDA®" pickup truck wall. This cargo holder consists of an initially flat metal bar 62 of about 10" in length which is initially bent to form an angle of approximately 150 degrees between a segment 43 and segment 34. Segment 34 is then curved slightly in the same direction as the first bend so as to follow the curvature of a "MAZDA®" truck wall. A first hook 57 is formed by segments 34 and 44, segment 44 being bent in the same direction as the initial bend. A second hook 58 is formed by segment 42 being bent in a direction opposite that of segment 44. A magnet 45 and magnet cover 46 are attached in a stacked manner to the outer edge of hook 57 at segment 44. Again, the magnet 45 prevents downward sliding of cargo holder 41 along a truck wall due to its weight. In this embodiment, the severe nature of the bend between segments 34 and 43, coupled with the additional curvature of segment 34, makes it difficult to maneuver one flexible tube along the entire length of segments 34 and 43. Therefore, the inventor has found it beneficial to use two flexible cylindrical tubes 47 and 48. A first tube 48 covers approximately one-third of the combined lengths of segments 34 and 43. This tube is disposed around the lower portions of the two segments. A second tube 47 covers approximately one-half of the combined lengths of segments 34 and 43. This tube is disposed around the upper portions of the two segments. A top surface 63 of the second tube 47 is cut at a 45 degree slope.

In use, the first hook 57 of cargo holder 41 engages the bottom edge of a wall of a pickup truck. Tubes 47 and 48 are then slid downwards on the cargo holder so that the distance between segment 44 and a lower portion of tube 48 is relatively small (as shown by position 50 in FIG. 9). Thus a clamping action is created on the truck wall. The holder 41 is prevented from sliding downwards on the truck wall with the aid of magnet 45. After hook 58 is caught by a tie-down rope, but before the rope is synched down, the tubes 47 and 48 are slid upward so as to protect the truck from accidental marring (position 49 in FIG. 9).

Although the present invention has been described in considerable detail with reference to certain preferred embodiments thereof, other embodiments are possible. For example, it will be apparent to those skilled in the art that these principles are equally adaptable to other makes and models of pickup trucks and other vehicles. All that is necessary is to vary the curvature of the cargo holders so that they form generally to the curvature of a particular pickup truck's wall. This may be done without departing from the overall teachings of this disclosure. Therefore, the spirit and scope of the appended claims should not be limited to the description of the preferred embodiments contained herein.

What is claimed is:

1. A cargo holder which may be firmly but detachedly clamped to an edge of a wall of a pickup truck's cargo bed comprising:

a metal bar having a top end, a bottom end, and a body between its top and bottom ends;

means attached to the bottom end of said bar for engaging an edge of said truck's wall, said wall engaging means comprising a first hook formed from a first continuation of said metal bar;

means attached to the top end of said bar for engaging a tie-down rope, said rope engaging means comprising a second hook formed from a second continuation of said metal bar, said second hook having a maximum dimension extending at an acute angle relative to a longitudinal axis of the bar body;

a flexible cylindrical tube having a top surface facing said second hook, a bottom end facing said first hook, an inside diameter, an outside diameter, and a length at least half as long as the body of said metal bar, disposed around said metal bar so as to slide along the body of the bar between the first and second hooks, wherein said first hook may cooperate with said sliding flexible tube so as to firmly clamp said cargo holder to an edge of said truck's wall;

said second hook further comprising a contour running longitudinally in the direction of said maximum dimension and facing the top surface of said tube, and wherein said top surface of said flexible tube is cut at an acute angle so as to substantially parallel the contour of said second hook.

2. A cargo holder as in claim 1, wherein said metal bar is formed from a piece of steel having a width of approximately three-quarters of an inch and a depth of approximately one-eighth of an inch.

3. A cargo holder as in claim 1, wherein the maximum dimension is greater than the flexible tube's inside diameter.

4. A cargo holder as in claim 1, wherein the outside diameter of said flexible tube is approximately three-quarters of an inch greater than the inside diameter of the tube.

5. A cargo holder as in claim 1, wherein said flexible tube is formed from a solid piece of dense rubber.

6. A cargo holder as in claim 1, wherein said flexible tube is formed from a sturdy piece of sponge rubber.

7. A cargo holder as in claim 1, further comprising a magnet attached to said first hook.

8. A cargo holder as in claim 7, further comprising a magnet cover stacked on top of said magnet.

9. A cargo holder which may be firmly but detachedly clamped to an edge of a wall of a pickup truck's cargo bed comprising:

a metal bar having a top end, a bottom end, and a body between its top and bottom ends;

means attached to the bottom end of said bar for engaging an edge of said truck's wall, said wall engaging means comprising a first hook formed from a first continuation of said metal bar;

means attached to the top end of said bar for engaging a tie-down rope, said rope engaging means comprising a second hook formed from a second continuation of said metal bar, said second hook having a maximum dimension extending at an acute angle relative to a longitudinal axis of the bar body;

at least two flexible cylindrical tubes having a combined length at least half as long as the body of said metal bar, disposed around said metal bar so as to slide along the body of the bar between the first and second hooks, wherein said first hook may cooperate with a first of said sliding flexible tubes so as to firmly clamp said cargo holder to an edge of said truck's wall, and a second of said flexible tubes has a top surface facing said second hook;

said second hook further comprising a contour running longitudinally in the direction of said maximum dimension and facing, the top surface of said second flexible tube, and wherein said top surface of said second flexible tube is cut at an acute angle so as to substantially parallel the contour of said second hook.

10. A cargo holder as in claim 9, further comprising a magnet attached to said first hook.

11. A cargo holder as claim 10, further comprising a magnet cover stacked on top of said magnet.

\* \* \* \* \*